(12) United States Patent
Tuli (10) Patent No.: US 9,301,259 B2
(45) Date of Patent: Mar. 29, 2016

(54) APPARATUS AND METHOD FOR PROVIDING DEVICE CHARGING INFORMATION

(71) Applicant: Nokia Technologies Oy, Espoo (FI)

(72) Inventor: Apaar Tuli, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 83 days.

(21) Appl. No.: 13/910,618

(22) Filed: Jun. 5, 2013

(65) Prior Publication Data

US 2014/0364173 A1    Dec. 11, 2014

(51) Int. Cl.
| | |
|---|---|
| *H04W 52/02* | (2009.01) |
| *H04B 1/3883* | (2015.01) |
| *H02J 7/02* | (2006.01) |
| *H04M 1/725* | (2006.01) |
| *H02J 7/00* | (2006.01) |

(52) U.S. Cl.
CPC ........... *H04W 52/0267* (2013.01); *H02J 7/025* (2013.01); *H04B 1/3883* (2013.01); *H02J 7/0047* (2013.01); *H02J 2007/0096* (2013.01); *H04M 1/72519* (2013.01)

(58) Field of Classification Search
CPC ....................................................... H02J 17/00
USPC ................... 455/573, 572, 566, 343.1, 127.1; 320/108, 150
See application file for complete search history.

(56) References Cited

U.S. PATENT DOCUMENTS

| | | | | |
|---|---|---|---|---|
| 8,868,939 | B2 * | 10/2014 | Matsuoka et al. ............ | 713/300 |
| 2006/0145659 | A1 | 7/2006 | Patino et al. | |
| 2008/0284379 | A1 * | 11/2008 | Hirano .......................... | 320/150 |
| 2010/0213895 | A1 * | 8/2010 | Keating et al. ................ | 320/108 |
| 2010/0289446 | A1 * | 11/2010 | Jang .............................. | 320/101 |
| 2011/0062916 | A1 * | 3/2011 | Farahani ....................... | 320/108 |
| 2011/0115429 | A1 * | 5/2011 | Toivola et al. ................ | 320/108 |
| 2011/0204849 | A1 * | 8/2011 | Mukai et al. .................. | 320/111 |
| 2012/0007549 | A1 * | 1/2012 | Murayama et al. ........... | 320/108 |
| 2012/0206098 | A1 * | 8/2012 | Kim .............................. | 320/108 |
| 2012/0295634 | A1 * | 11/2012 | Kim ............................ | 455/456.1 |
| 2013/0113421 | A1 * | 5/2013 | Han et al. ..................... | 320/108 |
| 2014/0206948 | A1 * | 7/2014 | Romem ........................ | 600/301 |

FOREIGN PATENT DOCUMENTS

| | | | |
|---|---|---|---|
| EP | 2 068 418 A2 | 6/2009 | |
| WO | WO 2007/015599 A1 | 2/2007 | |

OTHER PUBLICATIONS

International Search Report and Written Opinion for Application No. PCT/FI2014/050335 dated Jul. 29, 2014.

* cited by examiner

*Primary Examiner* — Minh D Dao
(74) *Attorney, Agent, or Firm* — Alston & Bird LLP (57) ABSTRACT

Mechanisms are described for providing information to a user regarding a wireless charging operation via the user's mobile terminal. Information may be received from a device engaged in a wireless charging operation, such as the user device being charged and/or the wireless charging plate via which the user device is charged, in response to a trigger. Information such as a charge time remaining, an amount of charge completed, or a charging queue status may be presented by the user's mobile terminal, such as via a display of the mobile terminal and/or through an audible indication provided by a speaker of the mobile terminal. The trigger may be any of a number of user interactions with the device engaged in the wireless charging operation.

15 Claims, 6 Drawing Sheets

APPARATUS AND METHOD FOR PROVIDING DEVICE CHARGING INFORMATION

TECHNOLOGICAL FIELD

Example embodiments of the present invention relate generally to providing information to a user regarding a wireless charging operation.

BACKGROUND

In the modern age of communications technology, users often have several electronic devices and accessories that they use throughout the day to conduct business, keep in touch with family and friends, access news and entertainment, etc. From tablet computers to handheld devices, headsets to speakers, user devices typically need to be charged for a certain amount of time to allow them to function.

With ever-increasing demands on their time, many users want to know the status of a charging operation to easily and promptly identify when a device has been fully charged or how much time is remaining, for example.

BRIEF SUMMARY OF EXAMPLE EMBODIMENTS

Accordingly, it may be desirable to provide tools that allow users of electronic devices to receive information regarding charging operations quickly and with minimal user interaction with respect to a number of different devices that may be charged. Embodiments of an apparatus, method, and computer program product are thus described that can receive information via a user's mobile terminal regarding a wireless charging operation, such as a charging operation in which a wireless charging plate is used to charge one or more of the user's devices.

In some embodiments, an apparatus may be provided that includes at least one processor and at least one memory including computer program code. The at least one memory and the computer program code may be configured to, with the processor, cause the apparatus to at least receive information from a device engaged in a wireless charging operation in response to a trigger and provide for presentation of the information by a mobile terminal. The device may be a device being charged via a wireless charging plate, or the device may be a wireless charging plate. The information may comprise at least one of a charge time remaining, an amount of charge completed, or a charging queue status. Moreover, the trigger may comprise a user interaction with the device engaged in the wireless charging operation.

In some cases, the at least one memory and the computer program code may be configured to, with the processor, cause the apparatus to provide for presentation of the information by providing for display of the information on a display of the mobile terminal. Additionally or alternatively, the at least one memory and the computer program code may be configured to, with the processor, cause the apparatus to provide for presentation of the information by providing for an audible indication of the information by the mobile terminal.

In other embodiments, a method and a computer program product are described for providing information to a user regarding a wireless charging operation via the user's mobile terminal by receiving information from a device engaged in a wireless charging operation in response to a trigger and providing for presentation of the information by a mobile terminal. The device may be a device being charged via a wireless charging plate, or the device may be a wireless charging plate. The information may comprise at least one of a charge time remaining, an amount of charge completed, or a charging queue status. The trigger may comprise a user interaction with the device engaged in the wireless charging operation.

In some cases, providing for presentation of the information may comprise providing for display of the information on a display of the mobile terminal. Additionally or alternatively, providing for presentation of the information may comprise providing for an audible indication of the information by the mobile terminal.

In still other embodiments, an apparatus is provided for providing information to a user regarding a wireless charging operation via the user's mobile terminal. The apparatus includes means for receiving information from a device engaged in a wireless charging operation in response to a trigger and means for providing for presentation of the information by a mobile terminal.

BRIEF DESCRIPTION OF THE SEVERAL VIEWS OF THE DRAWING(S)

Having thus described example embodiments of the invention in general terms, reference will now be made to the accompanying drawings, which are not necessarily drawn to scale, and wherein:

DETAILED DESCRIPTION

Some example embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

As noted above, it is common in this day and age for a user of electronic devices to have multiple devices, including device accessories, that require periodic charging to enable the device to function properly. During a charging operation, a rechargeable battery of the device may be connected to a power source (e.g., a source of electricity) to replenish the charge that is stored on the rechargeable battery, such that when the device is in use, energy stored on the rechargeable battery may be consumed for running the device based on the power usage demands of the device and/or any other devices (e.g., accessories) connected to the device.

In some cases, a wireless charging plate may be used to charge the device. The wireless charging plate may, for example, be a conductive charging pad that produces an electromagnetic field that charges a device that is placed upon it (e.g., via inductive charging). Depending on the type of rechargeable battery that is involved, prematurely stopping the charging operation (e.g., removing the device from the charging plate before the device is fully charged) may adversely impact the storage capacity of the battery and/or otherwise have a negative effect on the device and its ability to hold a charge. Moreover, a user who removes a device prior to reaching full charge may run out of power on his device unexpectedly due to the device being less than fully charged. A user charging a device may thus want to know the estimated amount of time left for a particular device to be fully charged and/or an amount of charge that has been completed (e.g., the percentage of the charging operation that has been completed).

A wireless charging plate may, in some cases, be large enough to accommodate more than one device, such that a user may place two, three, or more devices on its charging surface for charging. In some cases, the charging plate may be able to charge the devices simultaneously. In other cases, the devices may be charged sequentially, for example, if the wireless charging plate is only capable of charging one or two of the devices simultaneously. Once the charging operation for the first device or devices is completed, however, the wireless charging plate may automatically proceed to charge another of the devices that is positioned on the charging surface. In multiple-device charging scenarios, it may be beneficial for a user to know the charging status of a particular device, such as whether the device is currently being charged or the queue status of the device (e.g., how many devices are in line ahead of a particular device for purposes of the charging operation).

Although some devices have displays that enable a user to see whether the device is currently being charged and/or how much of the charging operation has been completed, some devices may not have dedicated displays for providing a user with such information. In addition, with respect to a multiple-device charging scenario, a user may want to obtain charging information for more than one device that is being charged without referring to each device individually.

Accordingly, example embodiments of the present invention provide mechanisms for providing information to a user regarding a wireless charging operation via the user's mobile terminal. Information may be received from a device engaged in a wireless charging operation in response to a trigger, and the information may be presented by the user's mobile terminal, such as via a display of the mobile terminal or an audible indication provided by the mobile terminal. The device from which the information is received may be the wireless charging plate or, in some cases, the electronic device itself, which is being charged via the wireless charging plate.

Figure 1:
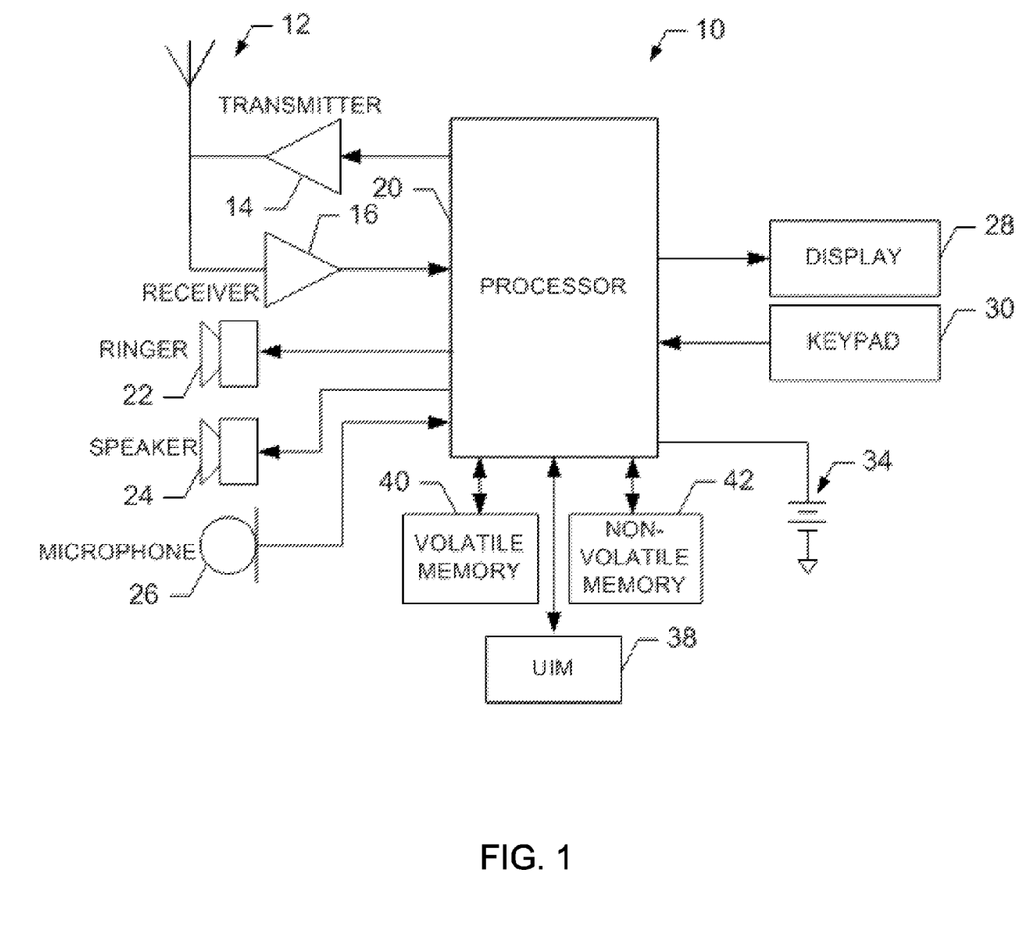
FIG. 1 illustrates one example of a communication system according to an example embodiment of the present invention.

Turning now to FIG. 1, which provides one example embodiment, a block diagram of a mobile terminal 10 that would benefit from embodiments of the present invention is illustrated. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a processor 20 or other processing device (e.g., processor 70 of FIG. 2), which controls the provision of signals to and the receipt of signals from the transmitter 14 and receiver 16, respectively. The signals may include signaling information in accordance with the air interface standard of the applicable cellular system, and also user speech, received data and/or user generated data. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch screen display (display 28 providing an example of such a touch screen display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch screen display, as described further below, may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

An example embodiment of the invention will now be described with reference to FIG. 2, which depicts certain elements of an apparatus 50 for receiving information regarding a wireless charging operation for presentation to a user. The apparatus 50 of FIG. 2 may be employed, for example, with the mobile terminal 10 of FIG. 1. However, it should be noted that the apparatus 50 of FIG. 2 may also be employed in connection with a variety of other devices, both mobile and fixed, and therefore, embodiments of the present invention should not be limited to application on devices such as the mobile terminal 10 of FIG. 1. For example, the apparatus 50 may be employed on a personal computer, a tablet, a mobile telephone, or other user terminal. Moreover, in some cases, part or all of the apparatus 50 may be on a fixed device such as a server or other service platform and the content may be presented (e.g., via a server/client relationship) on a remote device such as a user terminal (e.g., the mobile terminal 10) based on processing that occurs at the fixed device.

Figure 2:
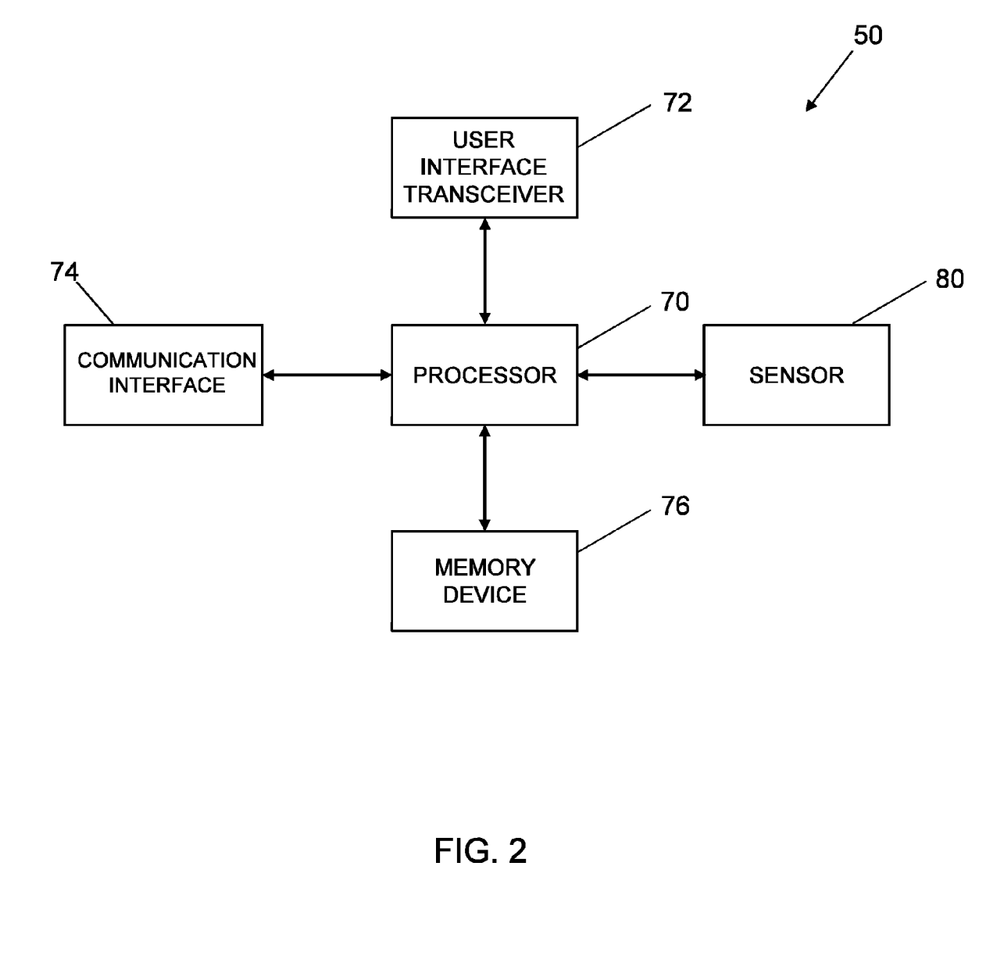
FIG. 2 illustrates a schematic block diagram of an apparatus for providing information to a user regarding a wireless charging operation via the user's mobile terminal according to an example embodiment of the present invention.

It should also be noted that while FIG. 2 illustrates one example of a configuration of an apparatus 50 for receiving information regarding a wireless charging operation for presentation to a user, numerous other configurations may also be used to implement embodiments of the present invention. As such, in some embodiments, although devices or elements are shown as being in communication with each other, hereinafter such devices or elements should be considered to be capable of being embodied within a same device or element and, thus, devices or elements shown in communication should be understood to alternatively be portions of the same device or element.

Referring now to FIG. 2, the apparatus 50 for receiving information regarding a wireless charging operation for presentation to a user may include or otherwise be in communication with a processor 70, a user interface transceiver 72, a communication interface 74, and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, content, applications, instructions, or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface transceiver 72 may be in communication with the processor 70 to receive an indication of a user input and/or to cause provision of an audible, visual, mechanical or other output to the user. As such, the user interface transceiver 72 may include, for example, a keyboard, a mouse, a joystick, a display, a touch screen(s), touch areas, soft keys, a microphone, a speaker, or other input/output mechanisms. Alternatively or additionally, the processor 70 may comprise user interface circuitry configured to control at least some functions of one or more user interface elements such as, for example, a speaker, ringer, microphone, display, and/or the like. The processor 70 and/or user interface circuitry comprising the processor 70 may be configured to control one or more functions of one or more user interface elements through computer program instructions (e.g., software and/or firmware) stored on a memory accessible to the processor 70 (e.g., memory device 76, and/or the like).

As shown in FIG. 2, the apparatus 50 may also include one or more sensors 80, such as a location information receiver (e.g., a GPS receiver), an accelerometer, a gyroscope, a compass, or the like, that may be in communication with the processor 70 and may be configured to determine the location of the apparatus and to detect changes in motion and/or orientation of the apparatus. In particular, according to some embodiments, the sensors 80 may include one or more proximity sensors that are configured to detect and/or quantify the proximity of a device engaged in a charging operation, such as a device that is being charged or a wireless charging plate. For example, the proximity sensor may be configured to emit and detect infrared light so as to calculate the distance and/or relative position of the device(s) engaged in a charging operation. As another example, the proximity sensor may be able to calculate the distance and/or relative position of the target using ultra-sonic signals. In some embodiments, as described in greater detail below, the detected proximity of a device (e.g., distance and/or relative position) may be used to trigger receipt and/or presentation of information regarding one or more devices that are being charged.

Figure 3:
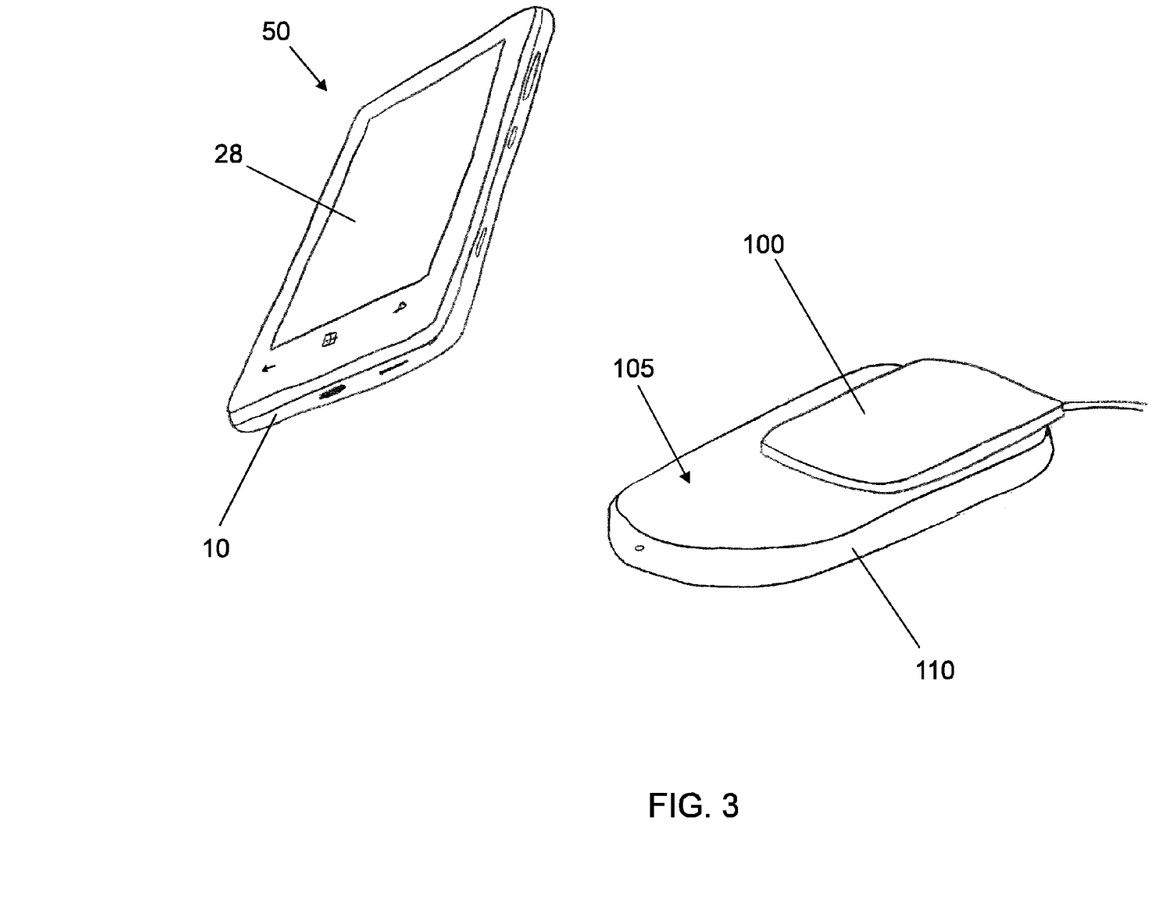
FIG. 3 illustrates a charging operation in which a single user device is being charged according to an example embodiment of the present invention.

Turning now to FIG. 3, in general, an apparatus 50 (shown in FIG. 2) is provided, such as an apparatus embodied by the mobile terminal 10 of FIG. 1 (e.g., a cellular phone) that has or is otherwise associated with a display 28, such as a touch screen display. As described above, the apparatus may comprise at least one processor (e.g., processor 70 of FIG. 2) and at least one memory (e.g., memory device 76 of FIG. 2) including computer program code. The at least one memory and the computer program code may be configured to, with the processor, cause the apparatus to receive information from a device engaged in a wireless charging operation in response to a trigger and to provide for presentation of the information by the mobile terminal 10.

In FIG. 3, for example, a scenario is illustrated in which a user device 100 to be charged (e.g., a portable digital assistant (PDA)) is laid upon a charging surface 105 of a wireless charging plate 110. Information regarding the wireless charging operation (e.g., the interaction between the wireless charging plate 110 and the user device 100 that charges the user device 100) may be received at a mobile terminal 10 that is in the vicinity of the wireless charging plate. The mobile terminal 10, which may be a cellular phone, for example, may act as a display for the user device 100 in some embodiments. Thus, in situations where the user device 100 being charged does not have its own display (such as in the case of headsets or speakers that do not have a dedicated display), the display 28 of the mobile terminal 10 acts as a display for the user device 100 to present information about the charge status of the user device. In this regard, the mobile terminal 10 may use a low power mode screen to display the information regarding the charging operation. In other cases, the apparatus may access and run a dedicated application stored on the mobile terminal 10 (e.g., via a processor of the mobile terminal) to present the information.

In this regard, the at least one memory and the computer program code may be configured to, with the processor, cause the apparatus to provide for presentation of the information by providing for display of the information on the display 28 of the mobile terminal 10. As described in greater detail below, such information may include, for example, a charge time remaining for the particular device, an amount of charge completed (e.g., 40% charged) for the particular device, or a charging queue status (e.g., in a multiple device charging scenario). Said differently, the display 28 of the mobile terminal 10 may serve as a dashboard to the wireless charging plate 110 and/or the devices interacting with the wireless charging plate.

In some embodiments, the device from which the information is received may be the device being charged via the wireless charging plate 110 (e.g., the user device 100), whereas in other embodiments the device from which the information is received may be the wireless charging plate itself. For example, the user device 100 may communicate directly with the apparatus 50 of the mobile terminal 10, such as by transmitting signals that are received via the antenna 12 of the mobile terminal 10 (shown in FIG. 1). In another example, the wireless charging plate 110 may enable or cause the user device 100 to push information to the mobile terminal display 28 via wireless computer network technology, such as using Bluetooth Low Energy (BLE) or Near Field Communication (NFC).

In some cases, the proximity of the mobile terminal 10 to the wireless charging plate 110 may serve as the trigger for causing information to be "pushed" by the user device and/or received by the apparatus 50. Proximity of the mobile terminal 10 with respect to the wireless charging plate 110 may be determined via the sensor 80 of FIG. 2, for example, as described above. Thus, in some cases, the information received by the apparatus 50 regarding the wireless charging operation may include a proximity component that may, for example, trigger the execution of an application on the mobile terminal 10 for providing for the presentation of the information, such as when the proximity component indicates that the mobile terminal is within a certain predetermined distance of the wireless charging plate 110 or the user device 100.

In other cases, the mobile terminal 10 may be configured such that the apparatus is able to determine that a wireless charging operation is taking place by determining a source of the charging (e.g., Universal Serial Bus (USB) cable, power charger, or wireless charger), such as via a signal received from the source of the charging identifying the source. In still other cases, the apparatus may be configured to determine that a wireless charging operation is taking place based on contextual information. For example, if the mobile terminal is being charged, the Bluetooth Low Energy (BTLE) signal strength from the charger is relatively strong (e.g., due to close proximity to the wireless charger), and the phone accelerometer sensors are indicating that the phone is lying relatively flat, then the determination may be made that that the mobile terminal is charging wirelessly.

As noted above, the information received may include information regarding the progress of the charging operation (e.g., how much charging time is left for the charging operation to be complete and/or the percentage of the full charge capacity that has been replenished with respect to a particular device). In a multiple-device charging scenario, discussed in greater detail below, the information may additionally or alternatively include a charging queue status.

Figure 4:
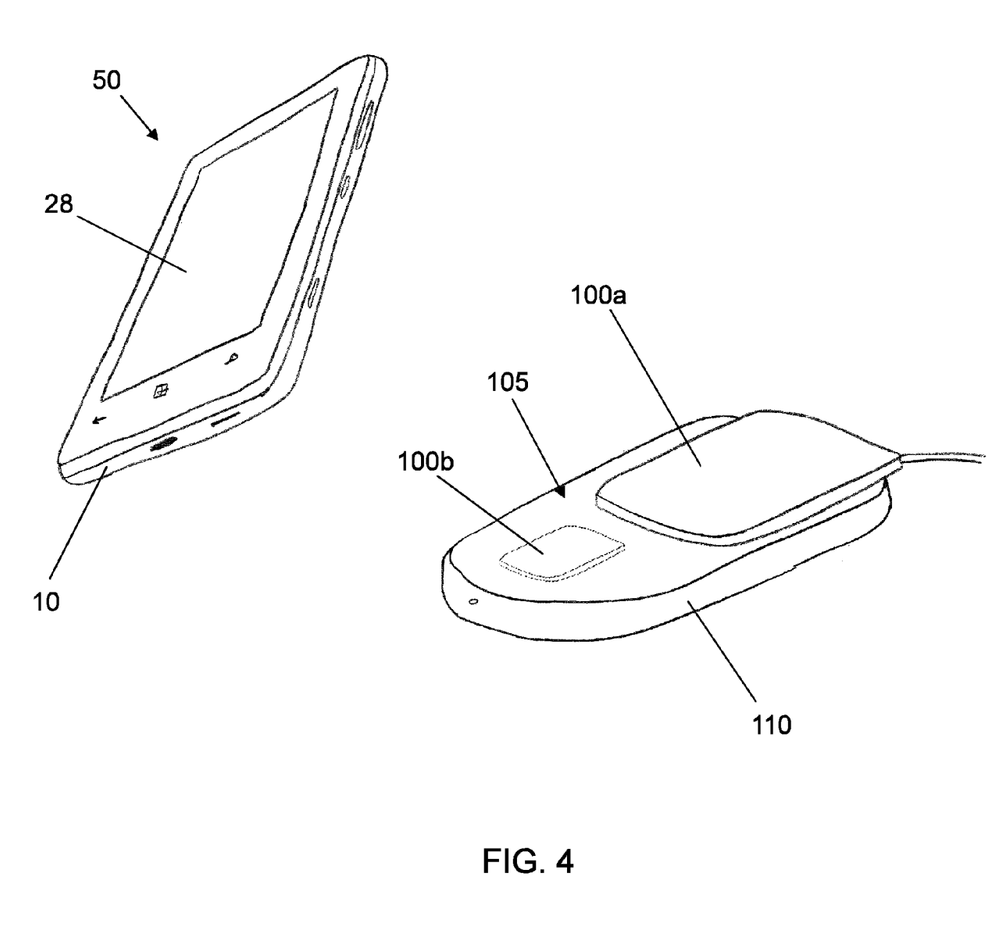
FIG. 4 illustrates a charging operation in which multiple user devices are being charged according to an example embodiment of the present invention.

For example, FIG. 4 shows a wireless charging plate 110 with two user devices 100*a*, 100*b* placed on the charging surface 105. The wireless charging plate 110 may, however, only be configured to charge one device at a time. For example, the wireless charging plate 110 may be configured to charge user devices 100*a*, 100*b* sequentially, such as based on the order in which they were placed on the charging surface 105. Accordingly, the device that was placed on the charging surface 105 first may be charged before charging the other user device. In such embodiments, information regarding the order of the devices 100*a*, 100*b* in a charging queue may be received by the apparatus 50 and presented to the user, such that the user can determine which user device 100*a*, 100*b* is currently being charged and, in some cases, the progress of its charging operation and/or the sequence of other user devices waiting to be charged. Furthermore, in some embodiments, when more than two devices are placed on the charging surface 105 to charge, the mobile terminal 10 may be caused (e.g., via the processor) to provide information (e.g., information received from the wireless charging plate 110) that the wireless charging plate 110 is not able to charge more than two devices at the same time.

Figure 5:
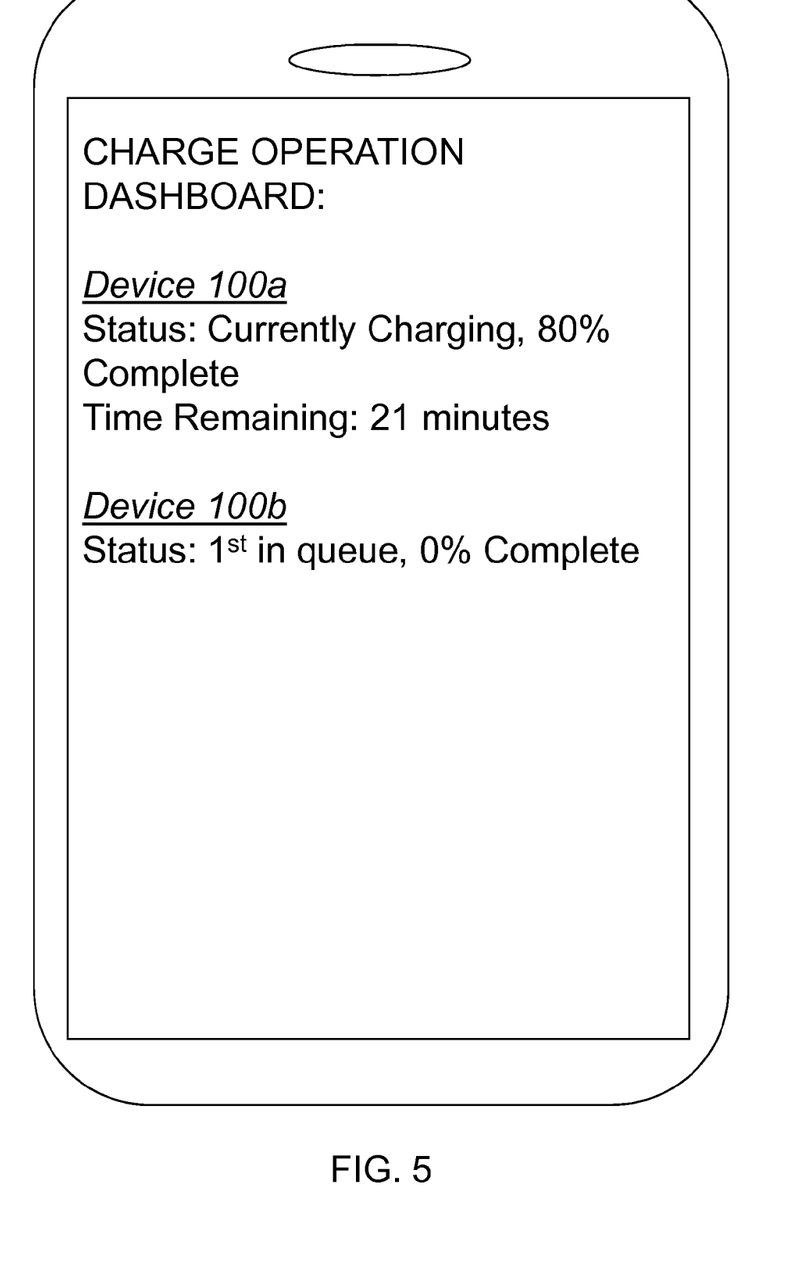
FIG. 5 illustrates a user interface of an apparatus displaying the information regarding the charging operation of FIG. 4 according to an example embodiment of the present invention.

In the example depicted in FIG. 4, the mobile terminal 10 may present the user with information as shown in FIG. 5. Thus, as illustrated in FIGS. 4 and 5, in this particular example, user device 100*a* is currently being charged, and user device 100*b* is next in the charging queue. User device 100*a* is currently at 80% of its full charge capacity and has 21 minutes left until it is fully charged. Once the charging operation with respect to user device 100*a* is completed, the charging operation for user device 100*b* would at that time begin, and the charging status of user device 100*b* will begin to progress towards 100% completion in this example.

As mentioned above, information may be received from a device (such as the user device 100 and/or the wireless charging plate 110) engaged in a wireless charging operation in response to a trigger. The trigger may comprise a user interaction with the device engaged in the wireless charging operation, such as interaction with the user device 100 or the wireless charging plate 110. For example, as described above, proximity of the mobile terminal 10 to the wireless charging plate 110 or the user device 100 engaged in the wireless charging operation may serve as the trigger for causing the information regarding the charging operation to be received by the apparatus 50 and/or presented to the user. Thus, for example, when the mobile terminal 10 (e.g., a cellular phone) is brought next to a user device 100 that is charging on the wireless charging plate 110 (as shown in FIG. 3), a user interface may be presented on the display 28 of the mobile terminal 10 that presents to the user a charging state of the user device (e.g., causing the mobile terminal to act as a probe by requesting information from the user device 100 and/or wireless charging plate 110). In other embodiments, however, other forms of user interaction with the user device 100 or the wireless charging plate 110 may serve as the trigger.

For example, in some embodiments, the user device 100 may be activated (e.g., caused to push information to the mobile terminal 10) when it is placed on the wireless charging plate 110, taken off the wireless charging plate, or otherwise touched or lifted briefly while lying on the charging plate. In other cases, the user may hold the mobile terminal 10 over the user device 100 as the user device is lying on the charging surface 105 of the wireless charging plate 110 (e.g., "hovering" over the user device) to trigger the transmission/receipt of information. In still other embodiments, the user may tap the wireless charging plate 110 (e.g., by "double-tapping" the charging surface 105) to "wake up" or otherwise activate the user device or devices 100 lying on the charging surface so as to receive their respective charging information.

In some scenarios, the mobile terminal 10 itself may be charging on the wireless charging plate 110. In such situations, the trigger may be created when a user device 100 is placed on the charging surface 105 of the wireless charging plate 110 next to the mobile terminal 10 that is being charged. As a result of the placement of the user device 100 on the charging surface 105 next to the mobile terminal 10, a low power mode of the mobile terminal 10 (e.g., the low power mode screen that may be presented on the display 28 during the charging operation) may be updated to show the charging status of the mobile terminal 10, as well as the charging status of the user device 100 that was placed next to the mobile terminal 10 (and, in some cases, any other user device that is lying on the charging surface 105 being charged or waiting to be charged).

Although the examples described above involve the proximity of the mobile terminal 10 to the wireless charging plate 110 and/or user device 100, in some embodiments the apparatus 50 may be caused (e.g., via the processor) to receive information from the device engaged in the wireless charging operation without requiring proximity of the mobile terminal. For example, the mobile terminal 10 may be used as a monitor or dashboard to show the user (via the display 28) the charging state of one or more devices 100 lying on the wireless charging plate 110 from a distance, such as using BLE and/or a hub arrangement to facilitate the communication of information.

In some embodiments, the at least one memory and the computer program code may be configured to, with the processor, cause the apparatus to provide for presentation of the information by providing for an audible indication of the information by the mobile terminal. For example, in addition or as an alternative to displaying the information on the display 28 of the mobile terminal 10, the apparatus 50 may be caused (e.g., via the processor) to provide an audible indication of the information, such as by providing an audible announcement via a speaker 24 of the mobile terminal (shown in FIG. 1). For instance, the apparatus 50 may be caused to announce "ready in 20 minutes" to indicate the time remaining until the user device 100 is fully charged. As another example, if the user device 100 is removed from the wireless charging plate 110 before it is fully charged, the apparatus 50 may be caused to announce its current charging state (e.g., "83% charged").

In one example scenario, in which the mobile terminal 10 is charging or is otherwise lying on the charging surface 105 of the wireless charging plate 110 and a user device 100 is placed on the same charging surface, the mobile terminal may be activated, and the apparatus (e.g., via the processor and the speaker) may be caused to provide an audible indication of the addition of the user device 100 to the charging queue. For instance, in this example, the mobile terminal 10 may "welcome" the device in an audible manner, such as by providing a tone indicating the addition of a device to be charged and/or an announcement such as "New device recognized for charging—charging operation pending."

Figure 6:
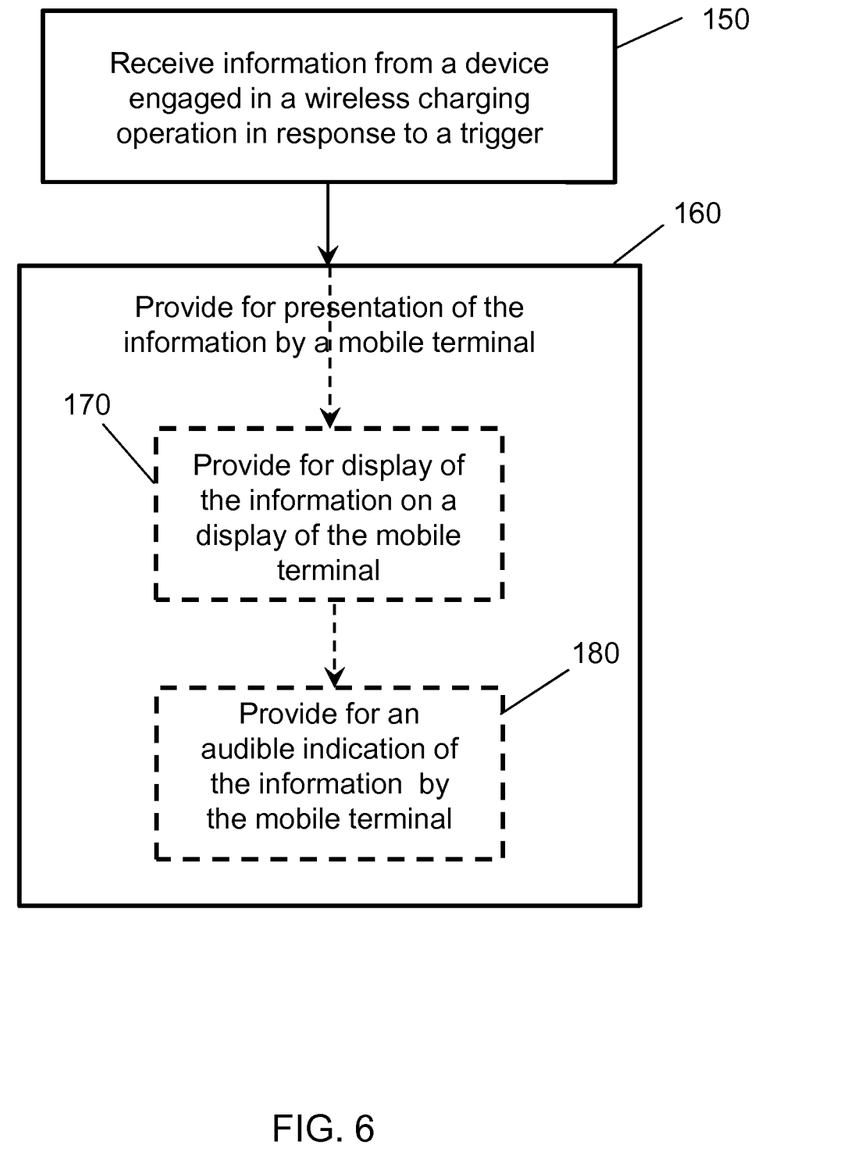
FIG. 6 illustrates a flowchart of methods of providing information to a user regarding a wireless charging operation via the user's mobile terminal according to an example embodiment of the present invention.

FIG. 6 illustrates a flowchart of systems, methods, and computer program products according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an example embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions, and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, one example embodiment of a method for providing information to a user regarding a wireless charging operation via the user's mobile terminal is shown in FIG. 6. FIG. 6 depicts an example embodiment of a method for providing information regarding a wireless charging operation that includes receiving information from a device engaged in a wireless charging operation in response to a trigger at block 150 and providing for presentation of the information by a mobile terminal at block 160. The device from which the information is received may be a device being charged via a wireless charging plate or the wireless charging plate itself, as described above. Moreover, the information may include at least one of a charge time remaining, an amount of charge completed, or a charging queue status.

In some cases, the trigger may comprise a user interaction with the device that is engaged in the wireless charging operation. For example, the trigger may be the bringing of the mobile terminal in proximity to the wireless charging plate or the device being charged; laying the device to be charged on the wireless charging plate next to the mobile terminal (e.g., where the mobile terminal is already engaged in a charging operation); tapping on the wireless charging plate; placing the user device onto the charging surface of the wireless charging plate; lifting the user device off the charging surface of the wireless charging plate; briefly lifting the user device off the charging surface and placing it back down again; hovering over the user device with the mobile terminal; and/or the like.

In some example embodiments, providing for presentation of the information may include providing for display of the information on a display of the mobile terminal at block 170. Additionally or alternatively, providing for presentation of the information may include providing for an audible indication of the information by the mobile terminal at block 180.

In some embodiments, certain ones of the operations above may be modified or further amplified as described below. Furthermore, in some embodiments, additional optional operations may be included, some examples of which are shown in dashed lines in FIG. 6. Modifications, additions, or amplifications to the operations above may be performed in any order and in any combination.

In an example embodiment, an apparatus for performing the methods of FIG. 6 above may comprise a processor (e.g., the processor 70 of FIG. 2) configured to perform some or each of the operations (150-180) described above. The processor may, for example, be configured to perform the operations (150-180) by performing hardware implemented logical functions, executing stored instructions, or executing algorithms for performing each of the operations. Alternatively, the apparatus may comprise means for performing each of the operations described above. In this regard, according to an example embodiment, examples of means for performing at least portions of operation 150 may comprise, for example, the communication interface 74, the processor 70, the memory device 76, and/or a device or circuit for executing instructions or executing an algorithm for processing information as described above. Examples of means for performing operations 160-180 may comprise, for example, the user interface transceiver 72, the processor 70, the memory device 76, and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. For example, although example scenarios are described above with respect to a wireless charging plate, other scenarios involving other types of chargers, wired and wireless, may also benefit from embodiments of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to at least:
   receive information from a wireless charging plate or a wirelessly chargeable device in response to a trigger; and
   provide for presentation of the information by a mobile terminal,
   wherein the information comprises charging information of the wirelessly chargeable device relating to a charging operation conducted between the wireless charging plate and the wirelessly chargeable device, and
   wherein the wirelessly chargeable device is a user device other than the mobile terminal that is presenting the information.

2. The apparatus of claim 1, wherein the information comprises at least one of a charge time remaining, an amount of charge completed, or a charging queue status.

3. The apparatus of claim 1, wherein the trigger comprises a user interaction with the wireless charging plate or the wirelessly chargeable device.

4. The apparatus of claim 1, wherein the at least one memory and the computer program code are configured to, with the processor, cause the apparatus to provide for presentation of the information by providing for display of the information on a display of the mobile terminal.

5. The apparatus of claim 1, wherein the at least one memory and the computer program code are configured to, with the processor, cause the apparatus to provide for presentation of the information by providing for an audible indication of the information by the mobile terminal.

6. A method comprising:
   receiving, via a processor, information from a wireless charging plate or a wirelessly chargeable device in response to a trigger; and
   providing for presentation of the information by a mobile terminal,
   wherein the information comprises charging information of the wirelessly chargeable device relating to a charging operation conducted between the wireless charging plate and the wirelessly chargeable device, and
   wherein the wirelessly chargeable device is a user device other than the mobile terminal that is presenting the information.

7. The method of claim 6, wherein the information comprises at least one of a charge time remaining, an amount of charge completed, or a charging queue status.

8. The method of claim 6, wherein the trigger comprises a user interaction with the wireless charging plate or the wirelessly chargeable device.

9. The method of claim 6, wherein providing for presentation of the information comprises providing for display of the information on a display of the mobile terminal.

10. The method of claim 6, wherein providing for presentation of the information comprises providing for an audible indication of the information by the mobile terminal.

11. A computer program product comprising at least one non-transitory computer-readable storage medium having computer-executable program code portions stored therein, the computer-executable program code portions comprising program code instructions for:
   receiving information from a wireless charging plate or a wirelessly chargeable device in response to a trigger; and
   providing for presentation of the information by a mobile terminal,
   wherein the information comprises charging information of the wirelessly chargeable device relating to a charging operation conducted between the wireless charging plate and the wirelessly chargeable device, and
   wherein the wirelessly chargeable device is a user device other than the mobile terminal that is presenting the information.

12. The computer program product of claim 11, wherein the information comprises at least one of a charge time remaining, an amount of charge completed, or a charging queue status.

13. The computer program product of claim 11, wherein the trigger comprises a user interaction with the wireless charging plate or the wirelessly chargeable device.

14. The computer program product of claim 11, wherein the program code instructions configured for providing for presentation of the information are further configured for providing for display of the information on a display of the mobile terminal.

15. The computer program product of claim 11, wherein the program code instructions configured for providing for presentation of the information are further configured for providing for an audible indication of the information by the mobile terminal.

* * * * *